United States Patent
Igaki et al.

(10) Patent No.: US 12,045,976 B2
(45) Date of Patent: Jul. 23, 2024

(54) PRODUCT MANAGEMENT METHOD

(71) Applicant: HONDA MOTOR CO., LTD., Tokyo (JP)

(72) Inventors: Masaya Igaki, Tochigi (JP); Shunsuke Konishi, Tochigi (JP); Yayoi Matsushita, Tochigi (JP); Yasuro Katsuyama, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 505 days.

(21) Appl. No.: 17/418,228

(22) PCT Filed: Dec. 26, 2019

(86) PCT No.: PCT/JP2019/051245
§ 371 (c)(1),
(2) Date: Jun. 24, 2021

(87) PCT Pub. No.: WO2020/138339
PCT Pub. Date: Jul. 2, 2020

(65) Prior Publication Data
US 2022/0085385 A1    Mar. 17, 2022

(30) Foreign Application Priority Data

Dec. 28, 2018   (JP) ................. 2018-247340

(51) Int. Cl.
*G06T 7/00*     (2017.01)
*G01N 21/88*    (2006.01)
(Continued)

(52) U.S. Cl.
CPC ......... *G06T 7/001* (2013.01); *G01N 21/8851* (2013.01); *H01M 4/8807* (2013.01); *H01M 8/1004* (2013.01); *G06T 2207/30164* (2013.01)

(58) Field of Classification Search
USPC .......................................... 702/83
See application file for complete search history.

(56) References Cited

U.S. PATENT DOCUMENTS

2015/0107774 A1*   4/2015   Lee .................... B32B 41/00
                                                 156/352
2019/0295238 A1*   9/2019   Sakai .................. G06T 7/001
(Continued)

FOREIGN PATENT DOCUMENTS

JP    H09173935 A    7/1997
JP    2007291535 A   11/2007
(Continued)

*Primary Examiner* — Paul D Lee
(74) *Attorney, Agent, or Firm* — CKC & Partners Co., LLC

(57) ABSTRACT

This product management method manages, by a computer, a membrane electrode assembly 21 and a fuel cell stack which are manufactured through a joining step S8 of joining electrode catalyst layers 25a, 26a to gas diffusion layers 25b, 26b that use carbon paper as a base material. The product management method is provided with: steps (S2, S5) of obtaining primary feature vector data by capturing an image at a specific site of each of a plurality of gas diffusion layers and storing the obtained primary feature vector data into a storage medium; and steps (S9, S11, S12) of comparing the feature vector data, which is obtained by capturing the image at the specific site of each of the gas diffusion layers that have undergone the steps (S2, S5), with a management database stored in the storage medium.

6 Claims, 7 Drawing Sheets

(51) Int. Cl.
*H01M 4/88* (2006.01)
*H01M 8/1004* (2016.01)

(56) References Cited

U.S. PATENT DOCUMENTS

2019/0340747 A1* 11/2019 Wang ................ H01M 8/2404
2021/0257646 A1* 8/2021 Quiazon ............... H01M 8/026

FOREIGN PATENT DOCUMENTS

| | | |
|---|---|---|
| JP | 2008089534 A | 4/2008 |
| JP | 201016952 A | 8/2010 |
| JP | 6217614 B2 | 10/2017 |
| JP | 2019003824 A | 1/2019 |
| JP | 2019155238 A | 9/2019 |

* cited by examiner

| | SPECIFIC INFORMATION | | | PRIMARY FEATURE VECTOR DATA | | |
|---|---|---|---|---|---|---|
| CARBON SHEET MANUFACTURING NUMBER | MANUFACTURING DATA | ROLL NUMBER | CUTOUT POSITION | FIRST FEATURE AMOUNT | ... | 256TH FEATURE AMOUNT |
| An*****1 | MM DD, YYYY | **1 | aa-TH COLUMN, 1ST ROW | 89 | ... | 13 |
| An*****2 | MM DD, YYYY | **1 | aa-TH COLUMN, 2ND ROW | 51 | ... | 45 |
| An*****3 | MM DD, YYYY | **1 | aa-TH COLUMN, 3RD ROW | 22 | ... | 92 |
| An*****4 | MM DD, YYYY | **1 | aa-TH COLUMN, 4TH ROW | 79 | ... | 20 |
| ... | ... | ... | ... | ... | ... | ... |
| Ca*****1 | MM DD, YYYY | **5 | bb-TH COLUMN, 1ST ROW | 83 | ... | 31 |
| Ca*****2 | MM DD, YYYY | **5 | bb-TH COLUMN, 2ND ROW | 72 | ... | 29 |
| Ca*****3 | MM DD, YYYY | **5 | bb-TH COLUMN, 3RD ROW | 10 | ... | 8 |
| Ca*****4 | MM DD, YYYY | **5 | bb-TH COLUMN, 4TH ROW | 17 | ... | 66 |
| ... | ... | ... | ... | ... | ... | ... |

6b, 6c

| CELL MANUFACTURING NUMBER | SECONDARY FEATURE VECTOR DATA | | |
|---|---|---|---|
| | FIRST FEATURE AMOUNT | ... | 256TH FEATURE AMOUNT |
| ****1 | 90 | ... | 15 |
| ****2 | 51 | ... | 47 |
| ****3 | 21 | ... | 90 |
| ****4 | 79 | ... | 23 |
| ... | ... | ... | ... |
| ****1 | 83 | ... | 32 |
| ****2 | 70 | ... | 28 |
| ****3 | 10 | ... | 9 |
| ****4 | 16 | ... | 67 |
| ... | ... | ... | ... |

6d

| CELL MANUFACTURING NUMBER | INSPECTION RESULT INFORMATION | | | |
|---|---|---|---|---|
| | INSPECTION A | INSPECTION B | INSPECTION C | |
| ****1 | aa POINTS | ba POINTS | ca POINTS | |
| ****2 | ab POINTS | bb POINTS | cb POINTS | |
| ****3 | ac POINTS | bc POINTS | cc POINTS | |
| ****4 | ad POINTS | bd POINTS | cd POINTS | |
| ... | ... | ... | ... | |

6e

| STACK MANUFACTURING NUMBER | LAYER NUMBER |
|---|---|
| ***1 | a1TH LAYER |
| ***1 | a2TH LAYER |
| ***2 | b1TH LAYER |
| ***2 | b2TH LAYER |
| ... | ... |

PRODUCT MANAGEMENT METHOD

TECHNICAL FIELD

The present invention relates to a product management method. In more detail, the present invention relates to a product management method for managing, by a computer, a product that has carbon paper as a material.

BACKGROUND ART

A fuel cell is formed by sandwiching, between a pair of separators, a membrane electrode assembly (a so-called MEA), which is formed by disposing an electrolyte layer which includes a solid polymer between an anode electrode body and a cathode electrode body. In addition, a fuel cell stack is formed by laminating a plurality of such fuel cells, and is mounted in a vehicle as a power supply for generating power to be supplied to a drive motor, for example.

Incidentally, carbon paper, which is electrically conductive and acid resistant, is often used as a base material for the anode electrode body or the cathode electrode body that make up each fuel cell. Accordingly, a plurality of pieces of carbon paper are used in one fuel cell stack. The performance of the fuel cell stack also greatly depends on the properties of each piece of carbon paper. Accordingly, in manufacturing steps for manufacturing a fuel cell stack, there is a need for a management system for managing what kind of carbon paper is used in a cathode electrode body, an anode electrode body, a fuel cell that includes these electrode assemblies, or a fuel cell stack formed by laminating these fuel cells.

Patent Document 1: Japanese Patent No. 6217614

DISCLOSURE OF THE INVENTION

Problems to be Solved by the Invention

For example, Patent Document 1 describes a management system that manages a fuel cell stack by attaching, to an MEA, an identifier on which is printed information pertaining to an inspection result for the MEA. Accordingly, using such a technique and attaching an identifier to carbon paper in a process for manufacturing a fuel cell stack can be considered. However, in this case, because there is a need to directly attach the identifier to the carbon paper, use of the portion of the carbon paper to which the identifier is attached for power generation ceases to be possible, and there is the risk that the carbon paper will be damaged. A dedicated reader is also needed to obtain information from the identifier, and there is a risk that management will become complicated.

An objective of the present invention is to provide a product management method, which is a method of managing a component or a product that has carbon paper as a base material, that can be managed without damaging the carbon paper.

Means for Solving the Problems (1) A product management method according to the present invention is a method for managing, by a computer (for example, a computer 5), an assembly (for example, an anode electrode body 25, a cathode electrode body 26, or a membrane electrode assembly 21 which are described below), which is manufactured through a material formation step (for example, a joining step S8 described below) including joining or coating a material (for example, a first electrode catalyst layer 25a or a second electrode catalyst layer 26a which are described below) to a workpiece (for example, carbon paper CA and CC, a first gas diffusion layer 25b, or a second gas diffusion layer 26b which are described below) that has carbon paper as a base material, or a product (for example, a fuel cell 2, or a fuel cell stack 1 which are described below) that has this assembly as a component, the method including: a registration step (for example, an anode-side initial registration step S2 and a cathode-side initial registration step S5 which are described below) including obtaining primary workpiece data (for example, primary feature vector data in FIG. 6 which is described below) by capturing an image of a specific site (for example, a specific site P, PA, or PC which are described below) at a portion of each of a plurality of workpieces to which the material is not joined or coated, and causing a storage medium (for example, a storage medium 55 described below) to store the obtained primary workpiece data for each workpiece; and a comparing step (for example, a cell management step S9, a cell inspection step S11, or a stack assembly/stack management step S12 which are described below) including obtaining reference workpiece data by capturing an image of the specific site of the workpiece that has undergone the registration step, and comparing the reference workpiece data with data stored in the storage medium.

(2) In this case, it is desirable that the specific site is a portion of a surface (for example, second surfaces CAb and CCb described below) of the workpiece to which the material is not joined or coated.

(3) In this case, it is desirable that the product management method further includes an updating step (for example, the cell management step S9 described below) including obtaining secondary workpiece data (for example, secondary feature vector data in FIG. 6 which is described below) by capturing an image of the specific site of the workpiece that has undergone the registration step and the material formation step, comparing the secondary workpiece data with a plurality of pieces of primary workpiece data stored in the storage medium, and causing the storage medium to store, in association, a piece of primary workpiece data having the highest degree of matching and the secondary workpiece data.

(4) A product management method according to the present invention is a method for managing an integrated electrode assembly (for example, an MEA 21 described below) having an anode electrode body (for example, the anode electrode body 25 described below) in which an anode electrode material (for example, the first electrode catalyst layer 25a described below) is joined or coated to a first gas diffusion layer (for example, the first gas diffusion layer 25b described below), a cathode electrode body (for example, the cathode electrode body 26 described below) in which a cathode electrode material (for example, the second electrode catalyst layer 26a described below) is joined or coated to a second gas diffusion layer (for example, the second gas diffusion layer 26b described below), and an ion exchange layer (for example, an electrolyte membrane 24 described below) sandwiched between the anode electrode body and the cathode electrode body, or a product (for example, the fuel cell 2 or the fuel cell stack 1 which are described below) that has the integrated electrode assembly as a component, the method including: an anode-side registration step (for example, the anode-side initial registration step S2 described below) including obtaining primary anode electrode data (for example, primary feature vector data within a broken line 6a in FIG. 6 described below) by capturing an image of a first specific site (for example, the specific site PA described below) at a portion of each of a plurality of first gas diffusion layers to which the anode electrode material is not joined or coated, and causing a storage medium (for example, the storage medium 55 described below) to store the obtained primary anode electrode data of each first gas diffusion layer; a cathode-side registration step (for example, the cathode-side initial registration step S5 described below) including obtaining primary cathode electrode data (for example, primary feature vector data within a broken line 6b in FIG. 6 described below) by capturing an image of a second specific site (for example, the specific site PC described below) at a portion of each of a plurality of second gas diffusion layers to which the cathode electrode material is not joined or coated, and causing a storage medium to store the obtained primary cathode electrode data of each second gas diffusion layer; and a comparing step (for example, the cell management step S9, the cell inspection step S11, or the stack assembly/ stack management step S12 which are described below) including obtaining reference electrode data by capturing an image of the first specific site of the first gas diffusion layer that has undergone the anode-side registration step or the second specific site of the second gas diffusion layer that has undergone the cathode-side registration step, and comparing the reference electrode data with the data stored in the storage medium.

(5) In this case, it is desirable that the product management method further includes: a cell management step (for example, the cell management step S9 described below) including causing the storage medium to store, in association, the primary anode electrode data of the first gas diffusion layer included in the integrated electrode assembly and the primary cathode electrode data of the second gas diffusion layer included in the integrated electrode assembly.

(6) In this case, it is desirable that the product management method further includes: a stack management step (for example, the stack assembly/stack management step S12 described below) including causing the storage medium to store, in association, the primary anode electrode data of each of a plurality of first gas diffusion layers included in a laminate (for example, the fuel cell stack 1 described below) formed by laminating a plurality of the integrated electrode assembly and the primary cathode electrode data of each of a plurality of second gas diffusion layers included in the laminate.

Effects of the Invention (1) Patterns on the surfaces of workpieces that have carbon paper as a base material respectively differ. Using these differences, in the registration step, primary workpiece data is obtained by capturing an image of a predetermined specific site of each of a plurality of workpieces, and a storage medium is caused to store the obtained primary workpiece data of each workpiece. In addition, in the comparing step, reference workpiece data is obtained by capturing an image of the specific site of the workpiece that has undergone this registration step, and this reference workpiece data is compared with the data stored in the storage medium. As a result, by virtue of the product management method according to the present invention, it is possible to specify what kind of workpiece is used for a workpiece to which various steps have been performed or what kind of workpiece is used in a product that has this workpiece as a component. In addition, in the product management method according to the present invention, because an image of a specific site of a workpiece is merely captured when performing the registration step, the comparing step, or the like, the workpiece is not damaged and consequently the performance of a component or a product is not reduced. In addition, in the product management method according to the present invention, the specific site for obtaining the primary workpiece data or the reference workpiece data is defined as a portion of the workpiece to which material is not joined or coated. By defining such a location as the specific site, it is possible to easily capture an image of the specific site even with respect to a workpiece that has undergone a material formation step, and it is also possible to compare obtained reference workpiece data with the primary workpiece data, and specify the origin, characteristics, or the like of this workpiece.

(2) When a material is joined or coated to a workpiece by a processing step such as pressure bonding or thermal transfer, for example, a pattern on the surface of the workpiece changes in accordance with this processing. However, the change in the pattern due to this processing is considered to be smaller for a surface to which the material is not joined or coated than for a surface to which the material is joined or coated. Accordingly, in the product management method according to the present invention, the specific site is set to a portion of a surface of the workpiece to which material is not joined or coated and for which change in the pattern of the surface due to processing is considered to be small. Accordingly, by virtue of the product management method according to the present invention, it is possible to improve accuracy in the comparing step because, by defining the specific site to such a location, it is possible to reduce change in the pattern of the specific site between before and after the material formation step.

(3) The pattern of the specific site may change between before and after the material formation step as described above. Accordingly, in the updating step, secondary workpiece data is obtained by capturing an image of the specific site of the workpiece that has undergone the registration step and the material formation step, comparing this secondary workpiece data with a plurality of pieces of primary workpiece data stored in the storage medium, and causing the storage medium to store, in association, a piece of primary workpiece data having the highest degree of matching and the secondary workpiece data. By causing the storage medium to store, in association, secondary workpiece data obtained in this fashion after going through the material formation step and primary workpiece data obtained before undergoing the material formation step, it is possible to compare reference workpiece data with the latest secondary workpiece data in the subsequent comparing step, and thus it is possible to further improve accuracy in the comparing step.

(4) The patterns on the surface of the first gas diffusion layer and the second gas diffusion layer respectively differ. Using these differences, in the cathode-side registration step, the primary cathode electrode data is obtained by capturing an image of a first specific site at a portion of each of the plurality of first gas diffusion layers to which the cathode electrode material is not joined or coated, and the storage medium is caused to store the obtained primary cathode electrode data for each first gas diffusion layer. In the anode-side registration step, the primary anode electrode data is obtained by capturing an image of a second specific site at a portion of each of the plurality of second gas diffusion layers to which the anode electrode material is not joined or coated, and the storage medium is caused to store the obtained primary anode electrode data for each second gas diffusion layer. In addition, in the comparing step, the reference electrode data is obtained by capturing an image of the first specific site of the first gas diffusion layer that has undergone the cathode-side registration step or the second specific site of the second gas diffusion layer that has undergone the anode-side registration step, and this reference electrode data is compared with data stored in the storage medium. As a result, by virtue of the product management method according to the present invention, it is possible to specify what kind of gas diffusion layer is used in an integrated electrode assembly provided with a cathode electrode body and an anode electrode body that form a pair, or in a laminate formed by laminating this integrated electrode assembly. In addition, in the product management method according to the present invention, because an image of a specific site of a gas diffusion layer is merely captured when performing the cathode-side registration step, the anode-side registration step, the comparing step, or the like, the gas diffusion layer is not damaged, and the performance of the laminate is not reduced. In addition, in the product management method according to the present invention, the specific site for obtaining the primary cathode electrode data, the primary anode electrode data, or the reference electrode data is defined as a portion of a gas diffusion layer to which an electrode material is not joined or coated. By defining the specific site to such a location, it is possible to easily capture an image of the specific site even with respect to an integrated electrode assembly or a laminate, and it is also possible to compare obtained reference electrode data with primary cathode electrode data or primary anode electrode data, and specify the origin, characteristics, or the like of this gas diffusion layer.

(5) In the cell management step, the storage medium is caused to store, in association, primary cathode electrode data of a first gas diffusion layer included in an integrated electrode assembly that includes a cathode electrode body and an anode electrode body that form a pair, and primary anode electrode data of a second gas diffusion layer included in the same integrated electrode assembly. By this, it is possible to specify that a gas diffusion layer having a specific origin, characteristics, or the like is used in a fuel cell provided with the integrated electrode assembly.

(6) In the stack management step, the storage medium is caused to store, in association, primary cathode electrode data for each of a plurality of first gas diffusion layers included in a laminate formed by laminating the integrated electrode assembly, and primary anode electrode data for each of a plurality of second gas diffusion layers included in the same laminate. By this, it is possible to specify that a gas diffusion layer having a specific origin, characteristics, or the like is used in a fuel cell stack provided with the laminate.

BRIEF DESCRIPTION OF THE DRAWINGS

FIG. 6 illustrates an example of a management database that is constructed in a storage medium;

PREFERRED MODE FOR CARRYING OUT THE INVENTION

Figure 1:
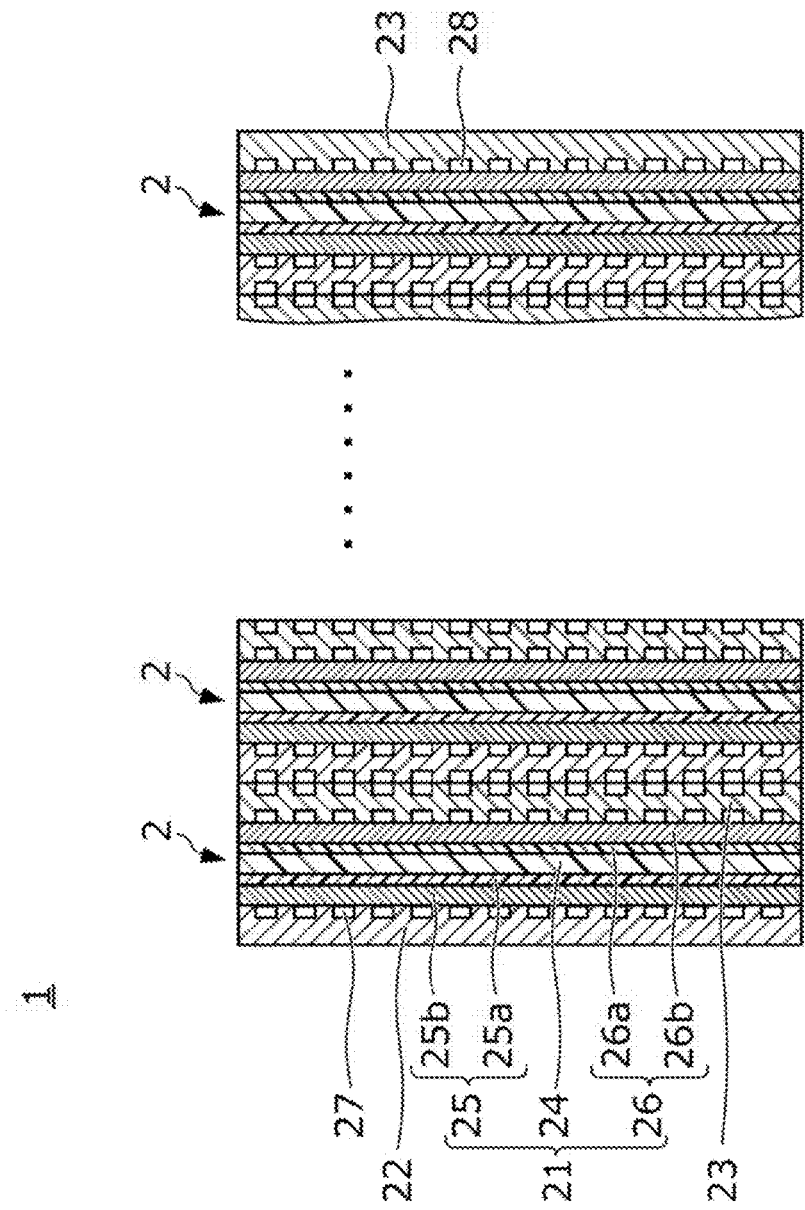
FIG. 1 illustrates a configuration of a fuel cell stack that is a target of management by a product management method according to an embodiment of the present invention.

While referring to the drawings, description is given below regarding a product management method according to an embodiment of the present invention. The product management method is executed in manufacturing steps for manufacturing a fuel cell stack 1 as illustrated in FIG. 1. Workpieces that have later-described carbon paper as a material, such as a plurality of fuel cell stacks 1 that are manufactured in these manufacturing steps, a plurality of fuel cells 2 that make up these fuel cell stacks 1, a plurality of membrane electrode assemblies 21 that make up this plurality of fuel cells 2, a plurality of electrode bodies 25, 26 that make up this plurality of membrane electrode assemblies 21, or a plurality of gas diffusion layers 25*b*, 26*b* that make up these electrode bodies 25, 26 are set as management targets, and the manufacturing number, the origin, and the like of these workpieces is managed.

FIG. 1 illustrates a configuration of a fuel cell stack 1 that is a target of management by the product management method according to the present embodiment. FIG. 1 illustrates only some of a plurality of fuel cells 2 that make up the fuel cell stack 1.

A fuel cell 2 is provided with a membrane electrode assembly 21 (hereinafter referred to as "MEA 21"), and a first separator 22 and a second separator 23 that sandwich the MEA 21 therebetween. The MEA 21 is, for example, provided with an electrolyte membrane 24 that is an ion exchange layer and includes a solid polymer such as a perfluorosulfonic acid thin film, an anode electrode body 25 provided on one surface of the electrolyte membrane 24, and a cathode electrode body 26 provided on the other surface of the electrolyte membrane 24.

The anode electrode body 25 is a porous body that is provided with a first electrode catalyst layer 25*a* that faces one surface of the electrolyte membrane 24, and a first gas diffusion layer 25*b* that is laminated on the first electrode catalyst layer 25*a*. The cathode electrode body 26 is a porous body that is provided with a second electrode catalyst layer 26*a* that faces the other surface of the electrolyte membrane 24, and a second gas diffusion layer 26*b* that is laminated on the second electrode catalyst layer 26*a*.

The first electrode catalyst layer 25*a* and the second electrode catalyst layer 26*a*, for example, include catalyst particles (an electrode catalyst) formed from a catalyst carrier which is made of carbon, such as carbon black or the like, and carries a catalytic metal such as platinum, and an ion conducting polymer binder. Note that it may be that the electrode catalyst described above includes only a catalytic metal such as platinum black, for example, and does not include a catalyst carrier.

The first gas diffusion layer 25*b* and the second gas diffusion layer 26*b* are sheet material that have carbon paper as a base material, for example. The first gas diffusion layer 25*b* is disposed so as to face the first separator 22, and the second gas diffusion layer 26*b* is disposed so as to face the second separator 23. A carbon separator, for example, is used for the first separator 22 and the second separator 23, but a metal separator may be used in place of a carbon separator.

An anode-side gas flow path 27, which communicates with an anode-side gas inlet communication hole (not illustrated) for supplying anode-side gas and an anode-side gas outlet communication hole (not illustrated) for discharging the anode-side gas, is formed on the surface of the first separator 22 that faces the first gas diffusion layer 25b.

A cathode-side gas flow path 28, which communicates with a cathode-side gas inlet communication hole (not illustrated) for supplying cathode-side gas and a cathode-side gas outlet communication hole (not illustrated) for discharging the cathode-side gas, is formed on the surface of the second separator 23 that faces the second gas diffusion layer 26b.

The fuel cell stack 1 is formed by laminating a plurality of fuel cells 2 as above.

Figure 2:
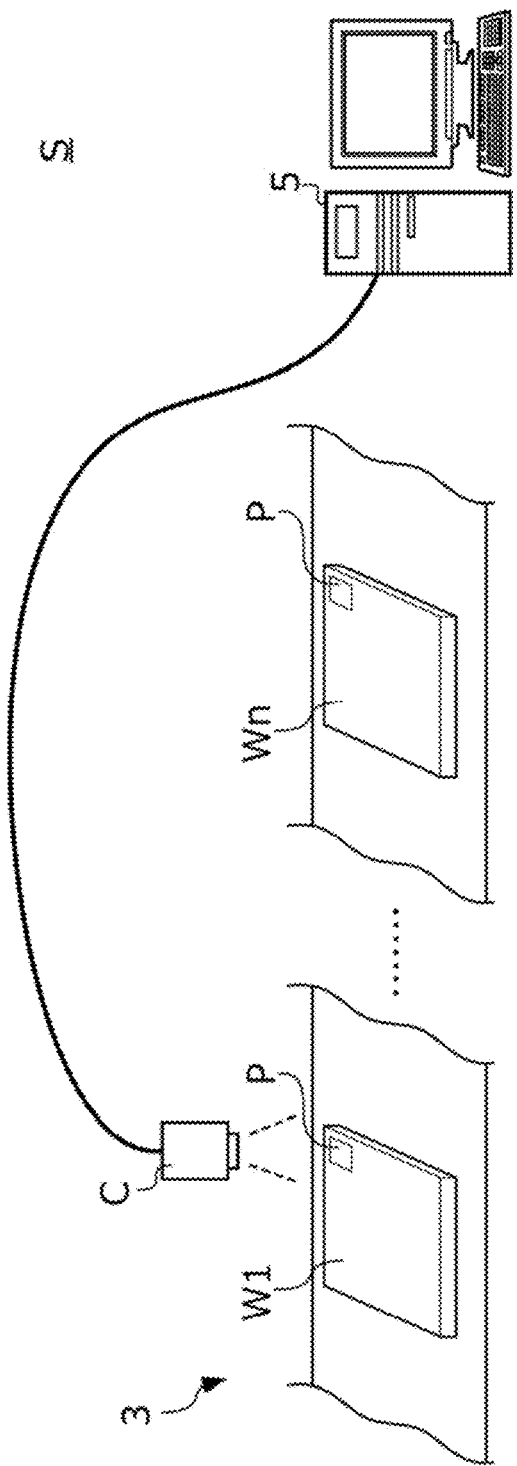
FIG. 2 illustrates a configuration of a management system used in the product management method.

FIG. 2 illustrates a configuration of a management system S used in the product management method. The management system S is incorporated in a portion of a manufacturing line 3 on which steps for manufacturing (refer to FIG. 5 described below) a fuel cell stack are performed. The management system S is provided with a camera C that captures images of, for example, n (n is an integer greater than or equal to 2) workpieces W1, ..., Wn that are management targets and travel on the manufacturing line 3, and a computer 5 on which is installed a program for processing image data obtained by the camera C.

The n workpieces W1, ..., Wn that travel on the manufacturing line are, for example, the fuel cell stack 1, the fuel cell 2, the membrane electrode assembly 21, the anode electrode body 25, the cathode electrode body 26, the first gas diffusion layer 25b, and the second gas diffusion layer 26b. These workpieces W1, ..., Wn include, as material, the gas diffusion layers 25b, 26b which have carbon paper as a base material. A pattern formed on the surface of carbon paper differs for each individual piece. Accordingly, in the management system S, the pattern of carbon paper at a specific site P defined in advance with respect to the workpieces W1, ..., Wn is used as an identifier to thereby manage the workpieces W1, ..., Wn.

The camera C captures images of the specific site P of the workpieces W1, ..., Wn that travel on the manufacturing line 3, and transmits obtained image data to the computer 5.

Figure 3:
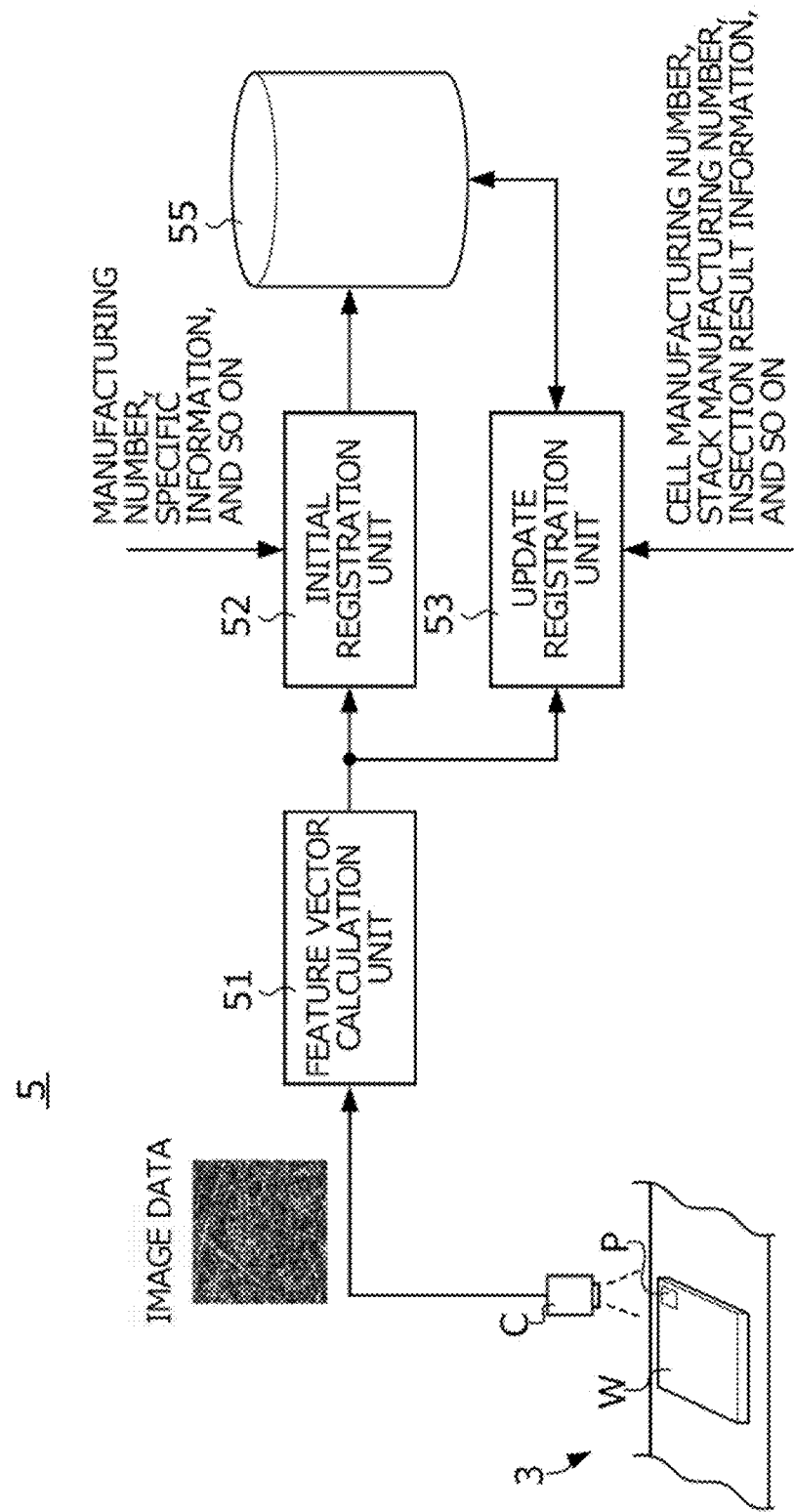
FIG. 3 is a functional block diagram realized in a computer.

FIG. 3 is a functional block diagram that is realized in the computer 5 by a program that is installed in the computer 5. The computer 5 is provided with a feature vector calculation unit 51 that calculates, based on image data of the specific site P of a workpiece W captured by the camera C, feature vector data that characterizes the workpiece W, an initial registration unit 52 that newly constructs a management database by causing a storage medium 55 to store in association the feature vector data calculated by the feature vector calculation unit 51 and various pieces of information (such as specific information or a carbon sheet manufacturing number described below) that characterize this workpiece W, and an update registration unit 53 that updates this management database after comparing the feature vector data calculated by the feature vector calculation unit 51 with the management database stored in the storage medium 55.

Figure 4:
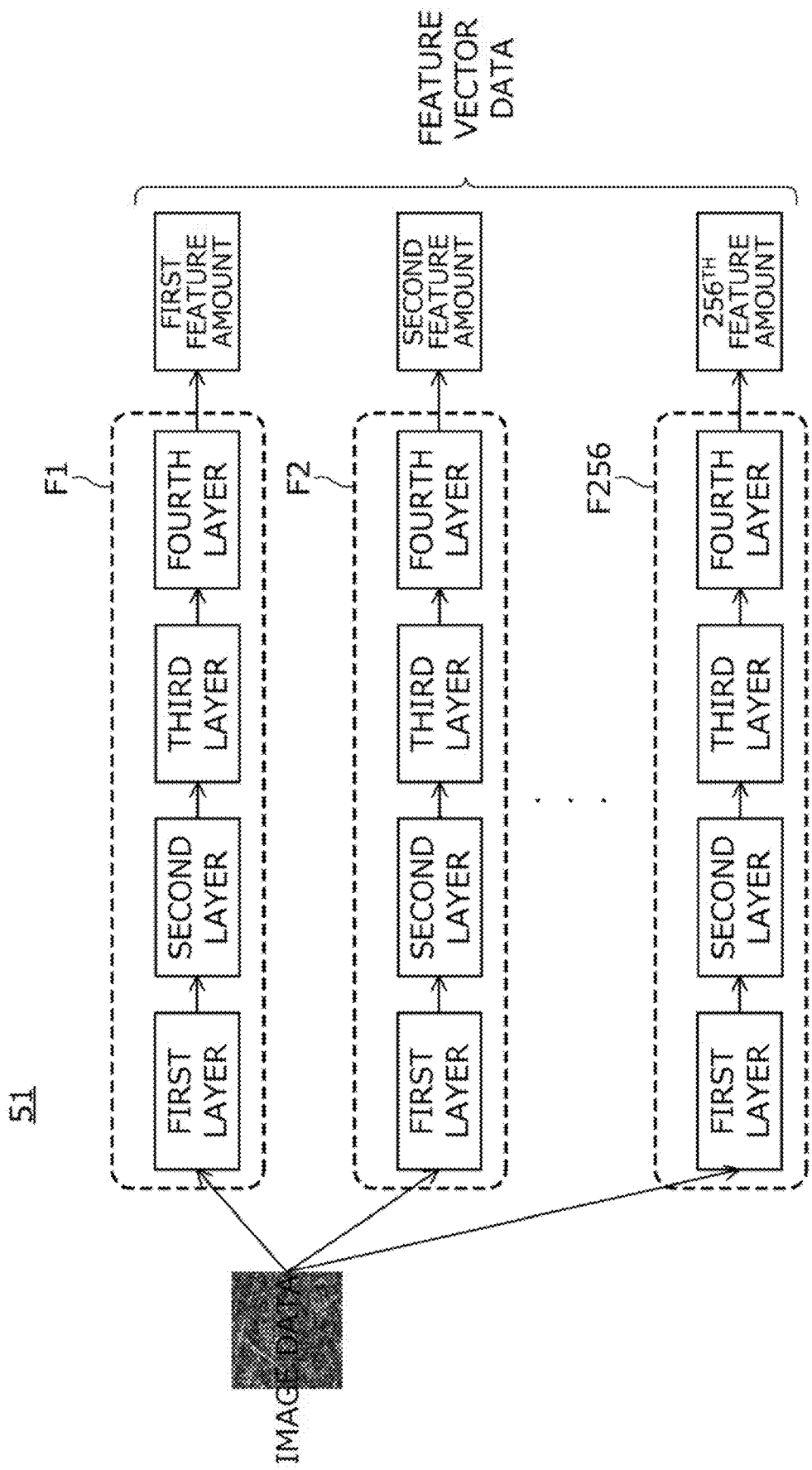
FIG. 4 illustrates a configuration of a feature vector calculation unit.

FIG. 4 illustrates a configuration of the feature vector calculation unit 51. The feature vector calculation unit 51 is, for example, provided with 256 types of filters from a first filter F1 to a 256th filter F256, and uses these filters to calculate, based on image data of the specific site P obtained by the camera C, feature vector data which is 256-dimension vector data having as components 256 scalar quantities from a first feature amount to a 256th feature amount. The filters F1 through F256, when inputted with a pixel value that characterizes the image data of the specific site P, respectively output first through 256th feature amounts which are integers in a predetermined range (for example, 0 through 99). The filters F1 through F256 are, for example, each configured by a four-layer neural network that has first, second, third, and fourth layers.

A plurality of pieces of carbon paper are prepared as samples, and feature amount vectors are calculated from image data of these samples. In accordance with these samples, neural networks trained in advance to be able to identify an appropriate sample are used to respectively configure the filters F1 through F256. More specifically, by using a camera, images of a predetermined portion of a plurality of pieces of carbon paper that are prepared as samples are captured at different times and in different environments, and image data for training and image data for verification are obtained for each sample. In addition, each neural network that configures the filters F1 through F256 evaluates a degree of matching between feature vector data calculated using image data for training prepared for each sample and feature vector data calculated using image data for verification obtained by capturing each sample at different times and in different environments, and each neural network is trained so that the highest degree of matching is between two pieces of feature vector data obtained from the same sample. The degree of matching between two pieces of feature vector data can be expressed numerically by calculating a norm value of difference vector data having as components the differences between respective components of two pieces of feature vector data. In other words, the smaller the norm value of the difference vector data, the higher it is possible to evaluate the degree of matching between the two pieces of feature vector data.

Figure 5:
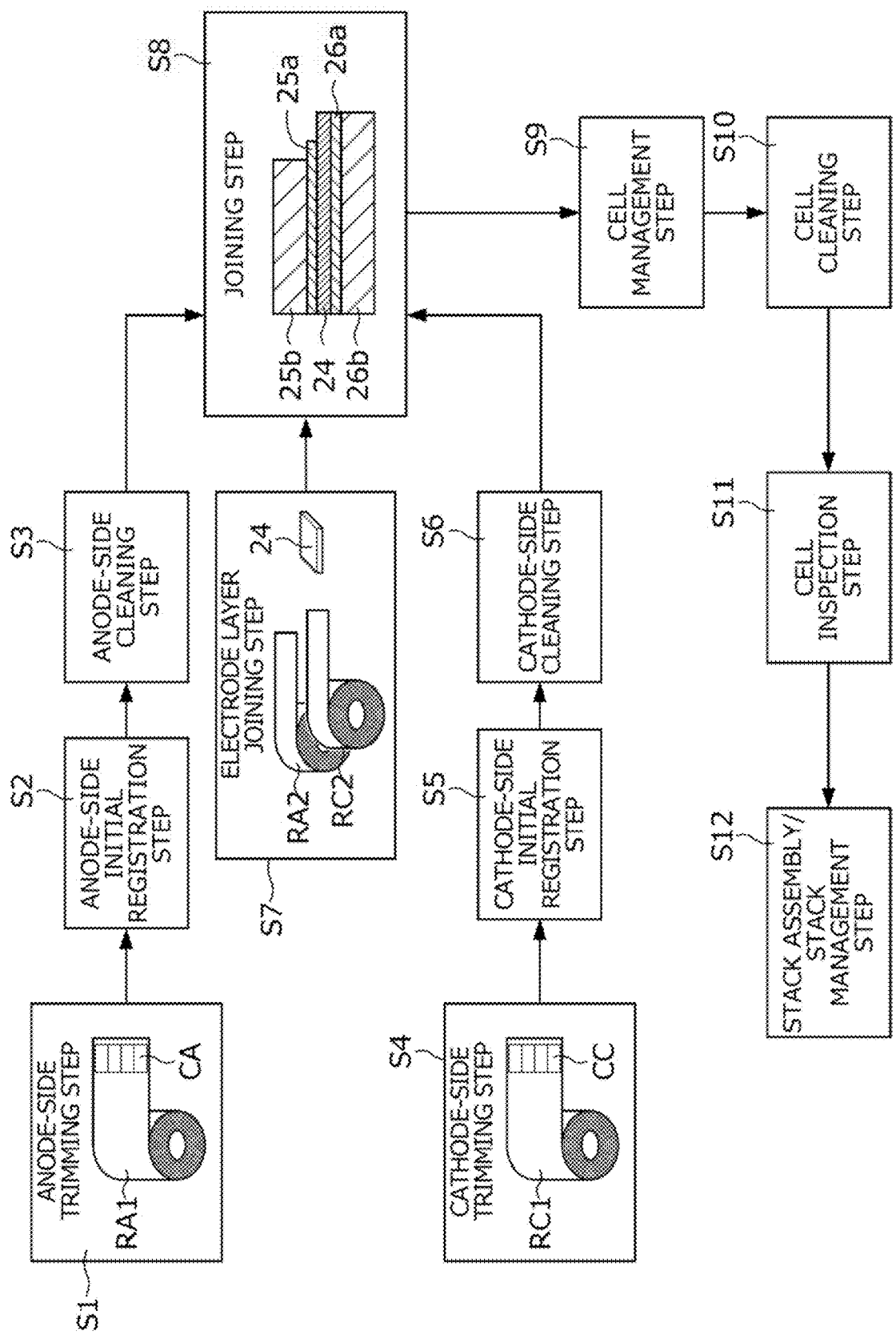
FIG. 5 illustrates a procedure having steps for manufacturing a fuel cell stack.

FIG. 5 illustrates a procedure having steps for manufacturing a fuel cell stack and in which the product management method according to the present embodiment is incorporated. The steps for manufacturing a fuel cell stack include an anode-side trimming step S1, an anode-side initial registration step S2, an anode-side cleaning step S3, a cathode-side trimming step S4, a cathode-side initial registration step S5, a cathode-side cleaning step S6, an electrode layer joining step S7, a joining step S8, a cell management step S9, a cell cleaning step S10, a cell inspection step S11, and a stack assembly/stack management step S12.

In the anode-side trimming step S1, while sending out a base paper roll of carbon paper RA1 prepared in advance for the first gas diffusion layer 25b of the anode electrode body 25, a plurality of rectangular pieces of carbon paper CA are cut out by a trimming device (not illustrated) cutting the base paper roll RA1. FIG. 5 is for describing a case in which four pieces of carbon paper CA are in one instance cut out along the width direction of the base paper roll RA1 in rows, but the present invention is not limited to this. The plurality of pieces of carbon paper CA cut out from the base paper roll RA1 in accordance with this anode-side trimming step S1 become the first gas diffusion layers 25b in the fuel cell stack 1.

In the anode-side initial registration step S2, by using the management system S, each piece of information regarding the plurality of pieces of carbon paper CA cut out in the anode-side trimming step S1 are registered, and a management database as exemplified in FIG. 6 is newly constructed. More specifically, in the anode-side initial registration step S2, the camera C captures an image of a specific site PA which is defined in advance for each piece of carbon paper CA as illustrated in FTC. 7. The specific site PA is defined as a portion of the carbon paper CA to which anode electrode material is not joined in the joining step SB described below. More specifically, the specific site PA is set to a portion of a second surface CAb of the carbon paper CA that is on a side opposite to a first surface CAa to which the anode electrode material is joined in the joining step S8.

Next in the anode-side initial registration step S2, the feature vector calculation unit 51, based on image data of the specific site PA that is captured by the camera C, calculates feature vector data. Next in the anode-side initial registration step S2, the initial registration unit 52 sets the feature vector data calculated for each piece by the feature vector calculation unit 51 as primary feature vector data, and causes the storage medium 55 to store this primary feature vector data. In this case, the initial registration unit 52 causes the storage medium 55 to store, in association, the primary feature vector data calculated for each piece, a carbon sheet manufacturing number assigned in a predetermined order for each piece of the carbon paper CA cut out in the anode-side trimming step S1, and specific information that is specific to the carbon paper CA that is set as a target. The specific information is, for example, the manufacturing date of the carbon paper CA, a roll number assigned to every single roll of the base paper roll RA1, the cutout position of the carbon paper CA, or the like. By the above, in the anode-side initial registration step S2, a management database as indicated by a broken line 6a in FIG. 6 is constructed in the storage medium 55.

Returning to FIG. 5, in the anode-side cleaning step S3, dust or foreign matter adhering to the carbon paper CA that has undergone the anode-side initial registration step S2 is removed by blowing air onto this carbon paper CA.

In the cathode-side trimming step S4, while sending out a base paper roll RC1 of carbon paper prepared in advance for the second gas diffusion layer 26b of the cathode electrode body 26, a plurality of rectangular pieces of carbon paper CC are cut out by a trimming device (not illustrated) cutting the base paper roll RC1. FIG. 5 is for describing a case in which four pieces of carbon paper CC are in one instance cut out along the width direction of the base paper roll RC1 in rows, but the present invention is not limited to this. The plurality of pieces of carbon paper CC cut out from the base paper roll RC1 in accordance with this cathode-side trimming step S4 become the second gas diffusion layers 26b in the fuel cell stack 1.

Figure 7:
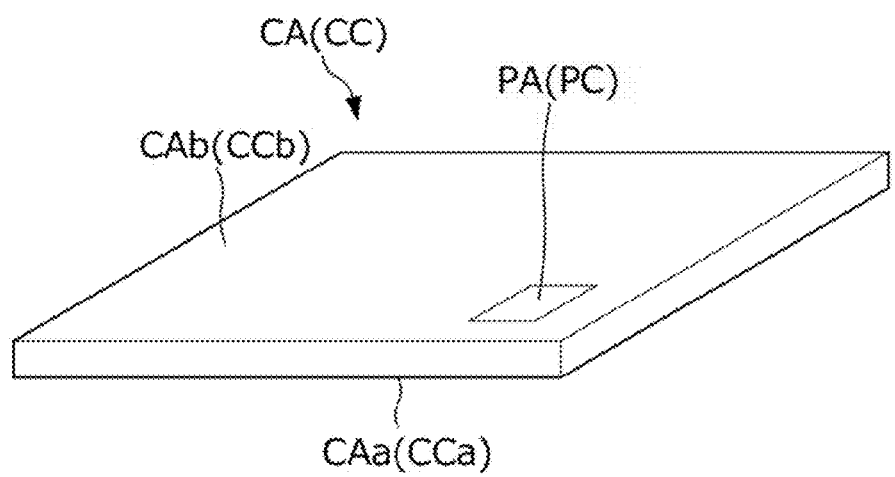
FIG. 7 illustrates an example of a specific site that is set on carbon paper.

In the cathode-side initial registration step S5, by using the management system S, each piece of information regarding the plurality of pieces of carbon paper CC cut out in the cathode-side trimming step S4 is registered, and a management database as exemplified in FIG. 6 is newly constructed. More specifically, in the cathode-side initial registration step S5, the camera C captures an image of a specific site PC which is defined in advance for each piece of carbon paper CC as illustrated in FIG. 7. The specific site PC is defined as a portion of the carbon paper CC to which cathode electrode material is not joined in the joining step S8 described below. More specifically, the specific site PC is set to a portion of a second surface CCb of the carbon paper CC that is on a side opposite to a first surface CCa to which the cathode electrode material is joined in the joining step S8.

Next in the cathode-side initial registration step S5, the feature vector calculation unit 51, based on image data of the specific site PC that is captured by the camera C, calculates feature vector data. Next in the cathode-side initial registration step S5, the initial registration unit 52 sets the feature vector data calculated for each piece by the feature vector calculation unit 51 as primary feature vector data, and causes the storage medium 55 to store this primary feature vector data. In this case, the initial registration unit 52 causes the storage medium 55 to store, in association, the primary feature vector data calculated for each piece, a carbon sheet manufacturing number assigned in a predetermined order for each piece of the carbon paper CC cut out in the cathode-side trimming step S4, and specific information that is specific to the carbon paper CC that is set as a target. The specific information is, for example, the manufacturing date of the carbon paper CC, a roll number assigned to every single roll of the base paper roll RC1, the cutout position of the carbon paper CC, or the like. By the above, in the cathode-side initial registration step S5, a management database as indicated by a broken line 6b in FIG. 6 is constructed in the storage medium 55.

Returning to FIG. 5, in the cathode-side cleaning step S6, dust or foreign matter adhering to the carbon paper CC that has undergone the cathode-side initial registration step S5 is removed by blowing air onto this carbon paper CC.

In the electrode layer joining step S7, the anode electrode material cut out from a base paper roll RA2 of anode electrode material prepared in advance for the first electrode catalyst layer 25a of the anode electrode body 25 as well as the cathode electrode material cut out from a base paper roll RC2 of cathode electrode material prepared in advance for the second electrode catalyst layer 26a of the cathode electrode body 26 are joined by thermal transfer, for example, to respective surfaces of the electrolyte membrane 24 which has a sheet shape and is prepared in advance. As a result, the first electrode catalyst layer 25a and the second electrode catalyst layer 26a are joined to respective surfaces of the electrolyte membrane 24.

In the joining step S8, the electrolyte membrane 24, to which the electrode catalyst layer 25a and the second electrode catalyst layer 26a have been joined through the electrode layer joining step S7, is sandwiched between the carbon paper CA that has undergone the anode-side cleaning step S3 and the carbon paper CC that has undergone the cathode-side cleaning step S6, and subjected to pressure bonding. As a result, the MEA 21, which is configured by the carbon paper CA being joined to the first electrode catalyst layer 25a at the first surface CAa thereof, the carbon paper CC being joined to the second electrode catalyst layer 26a at the first surface CCa thereof, and the electrolyte membrane 24 being sandwiched between the anode electrode body 25 and the cathode electrode body 26, is manufactured. As described above, the specific sites PA and PC are set on the second surfaces CAb and CCb of the carbon paper CA and CC. Accordingly, the specific sites PA and PC can be visually recognized from the outside of the MEA 21 that is manufactured through the joining step S8.

Figure 8:
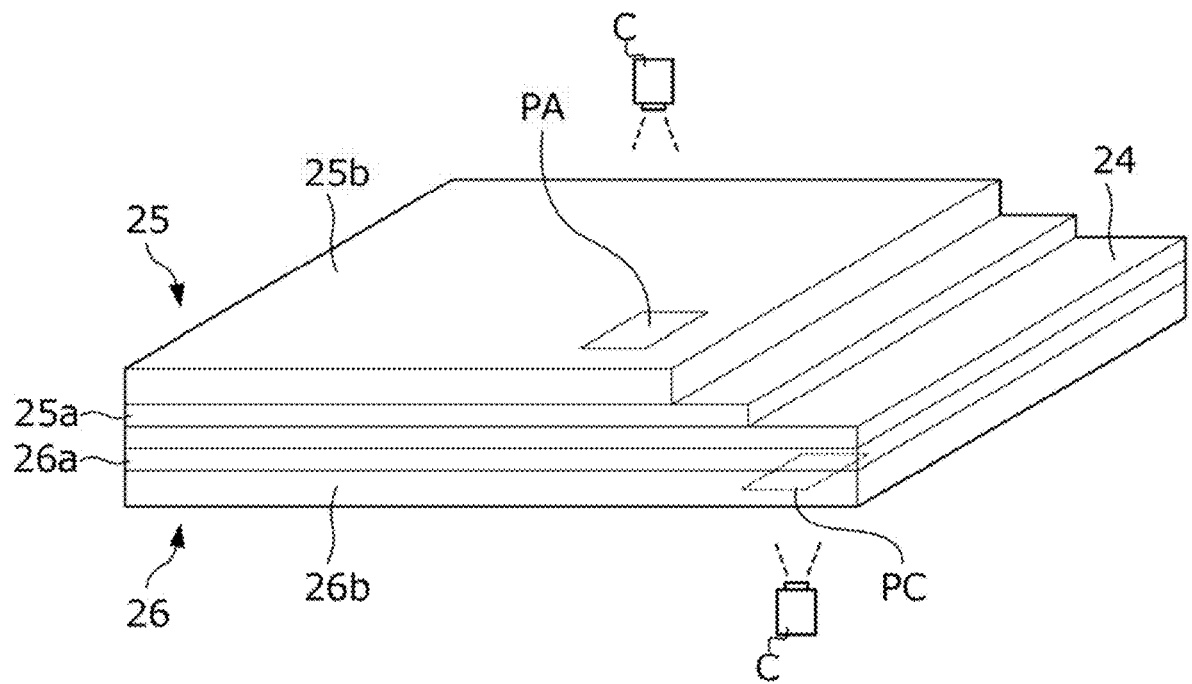
FIG. 8 illustrates an example of specific sites that are set on an MEA.

In the cell management step S9, by using the management system S, various pieces of information on a plurality of the MEA 21 manufactured through the joining step S8 are registered, and the management database is updated as exemplified in FIG. 6. More specifically, in the cell management step S9, the camera C captures an image of the specific site PA which is set to a portion of the first gas diffusion layer 25b that makes up the MEA 21 as illustrated in FIG. 8 other than to where the first electrode catalyst layer 25a is joined, and the camera C captures an image of the specific site PC which is set to a portion of the second gas diffusion layer 26b that makes up the MEA 21 other than to where the second electrode catalyst layer 26a is joined.

Next in the cell management step S9, the feature vector calculation unit 51, based on image data of the specific sites PA and PC that are captured by the camera C, calculates feature vector data. Next in the cell management step S9, the update registration unit 53 sets feature vector data calculated based on the image data of the specific site PA as secondary feature vector data, compares this secondary feature vector data with the management database stored in the storage medium 55, and specifies the carbon sheet manufacturing number of the first gas diffusion layer 25b that makes up the MEA 21 that is set as a target. More specifically, the update registration unit 53 reads out a plurality of pieces of primary feature vector data included in the management database, extracts from this plurality of pieces of primary feature vector data a piece that has the highest degree of matching with the secondary feature vector data calculated based on the image data of the specific site PA, and specifies the carbon sheet manufacturing number associated with this piece of primary feature vector data that has the highest degree of matching. As described above, the degree of matching between two pieces of feature vector data can be expressed numerically in accordance with a norm value of difference vector data having as components the differences between respective components of two pieces of feature vector data. In other words, because the norm value of difference vector data decreases the closer two pieces of feature vector data are, it is possible to determine that a combination having the smallest norm value has a high degree of matching. In addition, the update registration unit 53 causes the storage medium 55 to store the secondary feature vector data, which is calculated based on the image data of the specific site PA, in association with the primary feature vector data or the carbon sheet manufacturing number specified as above.

In addition, the update registration unit 53 sets feature vector data calculated based on the image data of the specific site PC as secondary feature vector data, compares this secondary feature vector data with the management database stored in the storage medium 55, and, by the same procedure as described above, specifies the carbon sheet manufacturing number of the second gas diffusion layer 26b that makes up the MEA 21 that is set as a target. The update registration unit 53 then causes the storage medium 55 to store the secondary feature vector data, which is calculated based on the image data of the specific site PC, in association with the primary feature vector data or the carbon sheet manufacturing number specified as above. In addition, when causing the storage medium 55 to store secondary feature vector data which is assigned two pieces at a time to one MEA 21 as above, the update registration unit 53 causes the storage medium 55 to store, in association, these pieces of secondary feature vector data and a cell manufacturing number assigned in a predetermined order for every single MEA 21 manufactured in the joining step S8. By the above, in the cell management step S9, a management database as indicated by a broken line 6c in FIG. 6 is constructed in the storage medium 55.

Note that, according to the example in FIG. 6, a first gas diffusion layer for which the carbon sheet manufacturing number is "An***1" is associated with a second gas diffusion layer for which the carbon sheet manufacturing number is "Ca*1", to which is assigned the same cell manufacturing number "1" as that of the first gas diffusion layer. Therefore, according to the example in FIG. 6, it is possible to specify that an MEA for which the cell manufacturing number is "1" is assembled with the carbon sheet having the carbon sheet manufacturing number "An*1" as the first gas diffusion layer, and the carbon sheet having the carbon sheet manufacturing number "Ca***1" as the second gas diffusion layer. Note that, as illustrated in FIG. 6, there are slight differences between the primary feature vector data and the secondary feature vector data associated therewith. These differences are due to changes in the patterns at the specific sites PA and PC on the carbon sheets by the anode-side cleaning step, the cathode-side cleaning step, the joining step, and the like being performed after the primary feature vector data is obtained and before the secondary feature vector data is obtained. Accordingly, when comparing feature vector data calculated based on an image captured using the camera C in step after the cell management step with the management database, it is desirable to calculate the degree of matching of the newly obtained feature vector data with the secondary feature vector data which is thought to reflect the latest state of the carbon paper.

Returning to FIG. 5, in the cell cleaning step S10, dust or foreign matter adhering to the MEA 21 which has undergone the cell management step S9 is removed by blowing air onto this MEA 21.

In the cell inspection step S11, various inspections for determining whether sufficient performance is ensured are performed with respect to the MEA 21 that has undergone the cell cleaning step S10. Also in the cell inspection step S11, the management system S is used to register information pertaining to results of the inspections, and the management database is updated. More specifically, in the cell inspection step S11, the camera C captures an image of the specific site PA of the MEA 21 that has undergone the cell cleaning step S10. The feature vector calculation unit 51 calculates feature vector data based on the image data of the specific site PA. Additionally, the update registration unit 53 compares the feature vector data calculated based on the image data of the specific site PA with the management database stored in the storage medium 55, and specifies a cell manufacturing number associated with secondary feature vector data having the highest degree of matching with this feature vector data. The update registration unit 53 also causes the storage medium 55 to store the information pertaining to the inspection results as described above in association with the cell manufacturing number specified as above. By the above, in the cell inspection step S11, a management database as indicated by a broken line 6d in FIG. 6 is constructed in the storage medium 55.

Note that, according to the example in FIG. 6, it is possible to specify that the MEA for which the cell manufacturing number is "**1" is assembled with the carbon sheet having the carbon sheet manufacturing number "An*1" as the first gas diffusion layer and the carbon sheet having the carbon sheet manufacturing number "Ca***1" as the second gas diffusion layer, and inspection results for this MEA are that the result of an inspection A is "aa points", the result of an inspection B is "ba points", and the result of an inspection C is "ca points".

In the stack assembly/stack management step S12, m (m is an integer greater than or equal to 2) MEAs 21 are selected from a plurality of MEAs 21 that have undergone the cell inspection step S11, and the fuel cell stack 1 is assembled by laminating the selected m MEAs 21. Note that, in the stack assembly/stack management step S12, by using the management system S, information pertaining to the fuel cell stack 1 is registered, and the management database as exemplified in FIG. 6 is updated.

More specifically, in the stack assembly/stack management step S12, an image of each specific site PA of the m MEAs 21 selected in order to assemble one fuel cell stack 1 is captured by the camera C. The feature vector calculation unit 51 calculates feature vector data based on the image data of the specific sites PA of the m MEAs 21. The update registration unit 53 compares feature vector data calculated based on the image data of the specific sites PA of this plurality of MEAs 21 with the management database stored in the storage medium 55, and specifies a cell manufacturing number associated with secondary feature vector data having the highest degree of matching with each piece of feature vector data. The update registration unit 53 also causes the storage medium 55 to store a stack manufacturing number assigned in a predetermined order for each single fuel cell stack 1 assembled in the stack assembly/stack management step S12 and a layer number corresponding to a position where an MEA 21 that is a target is inserted in the single fuel cell stack 1, in association with a cell manufacturing number specified as described above. By the above, in the stack assembly/stack management step S12, a management database as indicated by a broken line ne in FIG. 6 is constructed in the storage medium 55.

Note that, according to the example in FIG. 6, it is possible to specify that an MEA for which the cell manufacturing number is "**1" and an MEA for which the cell manufacturing number is "2" are used for a fuel cell stack for which the stack manufacturing number is "*1". According to the example in FIG. 6, it is also possible to specify that, in the fuel cell stack for which the stack manufacturing number is "*1", the MEA for which the cell manufacturing number is "1" is used as the "a1th layer" and the MEA for which the cell manufacturing number is "**2" is used for the "a2th layer".

One embodiment of the present invention is described above, but the present invention is not limited to this embodiment. Detailed configuration may be changed, as appropriate, within the scope of spirit of the present invention. For example, description was given in the embodiment described above regarding a case in which the anode electrode body 25 and the cathode electrode body 26 are manufactured by joining the first gas diffusion layer 25b and the second gas diffusion layer 26b with the first electrode catalyst layer 25a and the second electrode catalyst layer 26a, respectively, but the present invention is not limited to this. The anode electrode body 25 and the cathode electrode body 26 may be manufactured by coating the first electrode catalyst layer 25a and the second electrode catalyst layer 26a onto the first gas diffusion layer 25b and the second gas diffusion layer 26b.

EXPLANATION OF REFERENCE NUMERALS

S . . . Management system
C . . . Camera
1 . . . Fuel cell stack (product)
2 . . . Fuel cell (product)
21 . . . MEA (assembly)
24 . . . Electrolyte membrane (ion exchange layer)
25 . . . Anode electrode body (assembly, anode electrode body)
25a . . . First electrode catalyst layer (material, anode electrode material)
25b . . . First gas diffusion layer (workpiece, first gas diffusion layer)
26 . . . Cathode electrode body (assembly, cathode electrode body)
26a . . . Second electrode catalyst layer (material, cathode electrode material)
26b . . . Second gas diffusion layer (workpiece, second gas diffusion layer)
5 . . . Computer
51 . . . Feature vector calculation unit
52 . . . Initial registration unit
53 . . . Update registration unit
55 . . . Storage medium
CA, CC . . . Carbon paper (workpiece)

The invention claimed is:

1. A product management method implemented by a computer, the method comprising:
    a registration step comprising obtaining primary workpiece data by capturing an image of a first specific site on a first side of each of a plurality of workpieces that has carbon paper as a base material, and causing a storage medium to store the obtained primary workpiece data for each workpiece;
    a material formation step comprising joining or coating a material to a second side of one of the workpieces to thereby manufacture an assembly or a product that has this assembly as a component, wherein the second side of said one of the workpieces is opposite the first side of said one of the workpieces, and the assembly or product has a second specific site that corresponds to the first specific site of said one of the workpieces; and
    a comparing step comprising obtaining reference workpiece data by capturing an image of the second specific site of the assembly or product, and comparing the reference workpiece data with the primary workpiece data stored in the storage medium.

2. The product management method according to claim 1, further comprising: an updating step comprising obtaining secondary workpiece data by capturing an image of the second specific site of the assembly or product at a later stage of manufacture of the assembly or product, comparing the secondary workpiece data with a plurality of pieces of primary workpiece data stored in the storage medium, and causing the storage medium to store, in association, a piece of primary workpiece data having the highest degree of matching and the secondary workpiece data.

3. A product management method for managing an integrated electrode assembly having an anode electrode body, a cathode electrode body, and an ion exchange layer sandwiched between the anode electrode body and the cathode electrode body, or a product that has the integrated electrode assembly as a component, the method comprising:
    an anode-side registration step comprising obtaining primary anode electrode data by capturing an image of a first specific site on a first side of each of a plurality of first gas diffusion layers, and causing a storage medium to store the obtained primary anode electrode data of each first gas diffusion layer;
    a cathode-side registration step comprising obtaining primary cathode electrode data by capturing an image of a second specific site on a first side of each of a plurality of second gas diffusion layers, and causing the storage medium to store the obtained primary cathode electrode data of each second gas diffusion layer;
    a manufacturing step to manufacture the integrated electrode assembly or the product by joining or coating an anode electrode material to a second side of one of the first gas diffusion layers, and joining or coating a cathode electrode material to a second side of one of the second gas diffusion layers, wherein the second side of said one of the first gas diffusion layers is opposite the first side of said one of the first gas diffusion layers, the second side of said one of the second gas diffusion layers is opposite the first side of said one of the second gas diffusion layers, and the integrated electrode assembly or the product has a third specific site that corresponds to the first specific site of said one of the first gas diffusion layers, and a fourth specific site that corresponds to the second specific site of said one of the second gas diffusion layers; and a comparing step comprising obtaining reference electrode data by capturing an image of the third specific site of the electrode assembly or the product, or an image of the fourth specific site of the electrode assembly or the product, and comparing the reference electrode data with the primary anode electrode data or the primary cathode electrode data stored in the storage medium.

4. The product management method according to claim 3, further comprising: a cell management step comprising causing the storage medium to store, in association, the primary anode electrode data of the first gas diffusion layer included in the integrated electrode assembly and the primary cathode electrode data of the second gas diffusion layer included in the integrated electrode assembly.

5. The product management method according to claim 4, further comprising: a stack management step comprising causing the storage medium to store, in association, the primary anode electrode data of each of a plurality of first gas diffusion layers included in a laminate formed by laminating a plurality of the integrated electrode assembly and the primary cathode electrode data of each of a plurality of second gas diffusion layers included in the laminate.

6. The product management method according to claim 3, further comprising: a stack management step comprising causing the storage medium to store, in association, the primary anode electrode data of each of a plurality of first gas diffusion layers included in a laminate formed by laminating a plurality of the integrated electrode assembly and the primary cathode electrode data of each of a plurality of second gas diffusion layers included in the laminate.

* * * * *